US005885692A

United States Patent [19]

Imashiro et al.

[11] Patent Number: 5,885,692
[45] Date of Patent: Mar. 23, 1999

[54] WAVE ABSORBER

[75] Inventors: Yasuo Imashiro; Shun Hasegawa; Isao Kato; Yoshihiko Kawahara, all of Tokyo, Japan

[73] Assignees: Nisshinbo Industries, Inc.; Nisshinbo Tempest, Inc., both of Tokyo, Japan

[21] Appl. No.: 829,382

[22] Filed: Mar. 31, 1997

[30] Foreign Application Priority Data

Apr. 5, 1996 [JP] Japan .................................... 8-110127

[51] Int. Cl.[6] .............................. H01Q 17/00; B32B 3/26

[52] U.S. Cl. ........................... 428/159; 342/4; 428/316.6; 428/317.9; 428/319.1

[58] Field of Search ................................ 181/284; 342/1, 342/4; 428/87, 95, 96, 316.6, 317.9, 319.1, 159; 521/136, 137, 181, 188

[56] References Cited

U.S. PATENT DOCUMENTS

| | | | |
|---|---|---|---|
| 4,334,971 | 6/1982 | Mahnke et al. | 204/159.21 |
| 4,681,712 | 7/1987 | Sakakibara et al. | 264/24 |
| 4,795,763 | 1/1989 | Gluck et al. | 521/99 |
| 5,331,567 | 7/1994 | Gibbons et al. | 364/481 |
| 5,373,296 | 12/1994 | Ishino et al. | 342/4 |

*Primary Examiner*—Blaine R. Copenheaver
*Attorney, Agent, or Firm*—Kubovcik & Kubovcik

[57] ABSTRACT

A wave absorber comprising a foamed resin and a dielectric loss material dispersed therein, wherein the foamed resin is a foamed melamine resin obtained by foaming a resin composition comprising, as the main components, a melamine-formaldehyde condensate and a foaming agent. The wave absorber alleviates the problems of the prior art, and is lightweight and superior in self-extinguishing property, and shows an excellent wave-absorbing property owing to a uniformly dispersed dielectric loss material.

3 Claims, 5 Drawing Sheets

WAVE ABSORBER

BACKGROUND OF THE INVENTION

1. Field of the Invention

The present invention relates to a wave absorber. More particularly, the present invention relates to a wave absorber which is lightweight and superior in self-extinguishing property, and shows an excellent wave-absorbing property owing to a uniformly dispersed dielectric loss material.

2. Prior Art

Anechoic chambers have been widely used for applications such as measurement of properties of antennas, testing of electromagnetic field intensity testers, measurement of jamming wave intensity, and the like. Each anechoic chamber is provided, at the wall, ceiling, floor, etc., with a wave absorber(s) (an example thereof is shown in FIG. 1) having, at the surface, a wave-absorbing portion consisting of a plurality of projections of circular cone shape, triangular pyramid shape, square pyramid shape, wedge shape or the like.

As such a wave absorber, there is in general and wide use one comprising (1) a foamed resin having the above-mentioned projections, consisting of a foamed polystyrene resin, a foamed polyurethane resin, a foamed polyethylene resin or the like and (2) a dielectric loss material (e.g. carbon black) dispersed in the foamed resin (1). The wave absorber is used in an anechoic chamber by adhering its back side to the wall, floor and ceiling of the anechoic chamber with an adhesive or the like.

Of various wave absorbers each comprising a different foamed resin, a wave absorber comprising a foamed polystyrene resin has the following problems. This wave absorber is obtained by adding a dielectric loss material (e.g. carbon black) and a binder to prefoamed polystyrene resin beads and then molding the mixture. Since the beads are particles of relatively large diameters (about 0.1–1 mm), the resulting foamed material has large-diameter cells, which requires addition of a large amount of a dielectric loss material (e.g. carbon black) in order for the final wave absorber to exhibit sufficiently high wave absorbability. Moreover, the wave absorber using a foamed polystyrene resin is applicable only in a relatively low-frequency zone and cannot be used in a high-frequency zone of, for example, 10 GHz or higher.

Meanwhile, a wave absorber comprising a foamed polyurethane resin has an advantage in that it is usable in a high-frequency zone because the foamed polyurethane resin has small cell diameters. However, this wave absorber has the following problems. That is, a foamed polyurethane resin has cells of nonuniform diameter and a large number of cell walls in skeleton of foamed resin, and this makes impossible the uniform dispersion of dielectric loss material (e.g. carbon black) in the foamed resin, by a process of impregnating the foamed and molded polyurethane resin with a latex containing a dielectric loss material and then drying the impregnated material, which process is necessary to produce a wave absorber comprising a foamed polyurethane resin.

In any wave absorber, an electric wave entering the absorber is converted into heat energy by dielectric loss, whereby the electric wave is absorbed by the absorber. In a wave absorber comprising a foamed polyethylene resin, since the polyethylene resin has a low softening point, heat build-up in the resin invites deformation or collapse of the foamed resin; moreover, since the polyethylene resin is flammable to inflammable, heat build-up in the resin may cause fuming, fire-catching, combustion, or harmful gas generation. These problems have become serious in recent years because the output of electric waves is becoming larger.

In order to alleviate the above-mentioned problems, there were proposed a method of producing a wave absorber by packing inorganic particles tightly (Japanese Patent Application Laid-Open [Kokai] No. 5-243781) and a method of producing a wave absorber by using a foamed phenolic resin (Japanese Patent Application Laid-Open [Kokai] No. 6-314894). However, these methods have problems as well. In the former method, the cell diameters are large as in the above-mentioned prefoamed polystyrene resin beads and the wave absorber produced is applicable only in a low-frequency zone. In the latter method, it is necessary to use a flame retardant of phosphorus or halogen type, giving a heavy foamed material (density: about 100 kg/m$^3$); this, together with the pyramid shape of the wave absorber produced, gives an oppressive feeling to the users of the wave absorber.

OBJECT AND SUMMARY OF THE INVENTION

The object of the present invention is to alleviate the above-mentioned problems of the prior art and provide a wave absorber which is lightweight and superior in self-extinguishing property, and shows high wave-absorbing property owing to a uniformly dispersed dielectric loss material.

The present inventors made a study based on a thought that since a foamed melamine resin is lightweight and has self-extinguishing property, and is very fine and uniform in cell diameters, the foamed melamine resin, which has high water absorbability and retainability, may be able to give a wave absorber which contains a dielectric loss material uniformly dispersed therein and which is lightweight and inflammable. As a result, the present invention has been completed.

According to the present invention, there is provided a wave absorber comprising a foamed resin and a dielectric loss material dispersed therein, wherein the foamed resin is a foamed melamine resin obtained by foaming a resin composition comprising, as the main components, a melamine-formaldehyde condensate and a foaming agent.

DETAILED DESCRIPTION OF THE INVENTION

Figure 1:
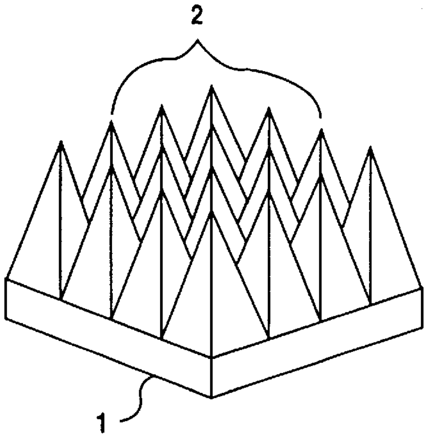
FIG. 1 is a perspective view of an example of the conical wave absorber obtained by the present invention.
Figure 2:
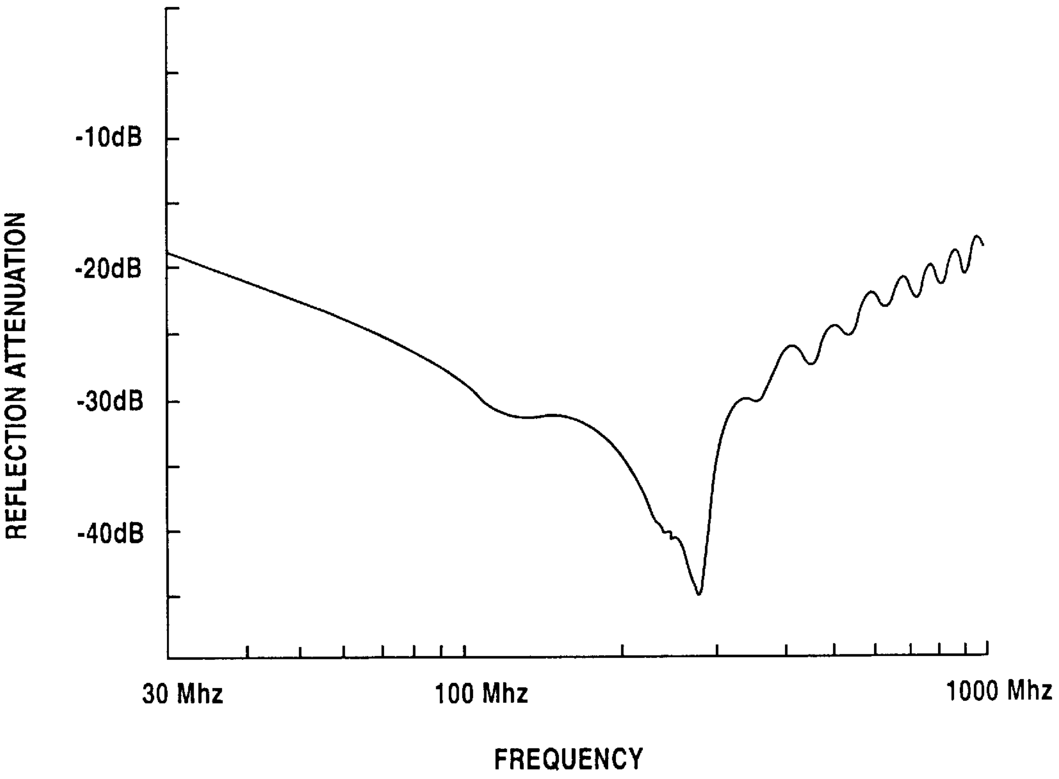
FIG. 2 is a graph showing the wave-absorbing property of a wave absorber obtained by laminating a ferrite type wave absorber on the wave absorber obtained in Example 1.
Figure 3:
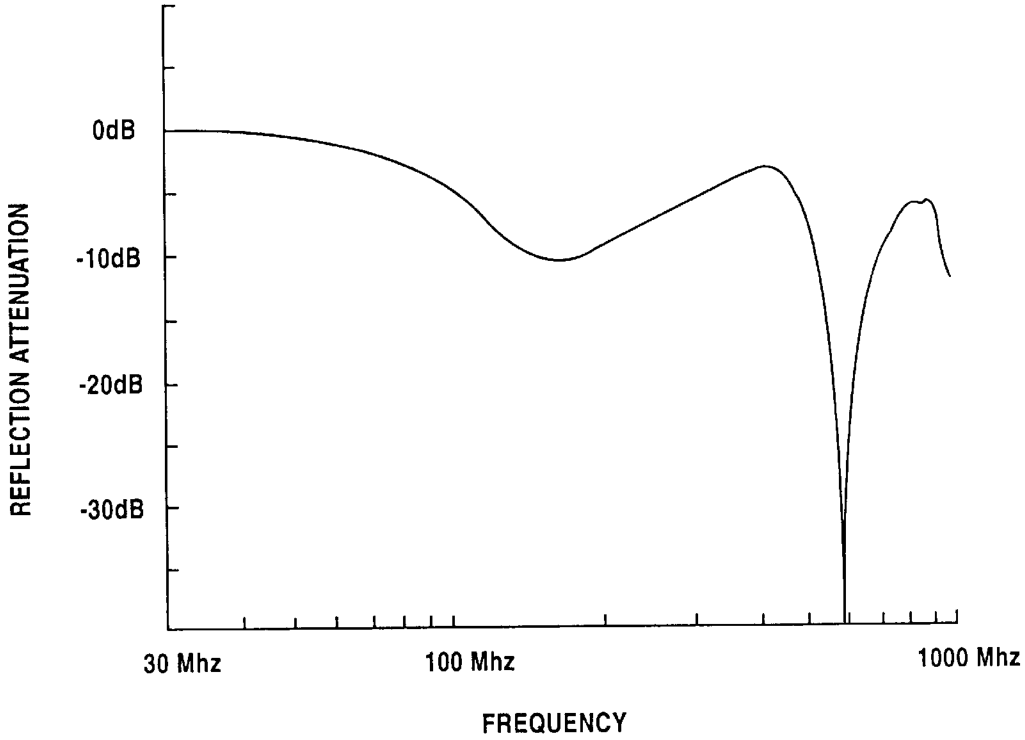
FIG. 3 is a graph showing the wave-absorbing property of the wave absorber obtained in Example 2.
Figure 4:
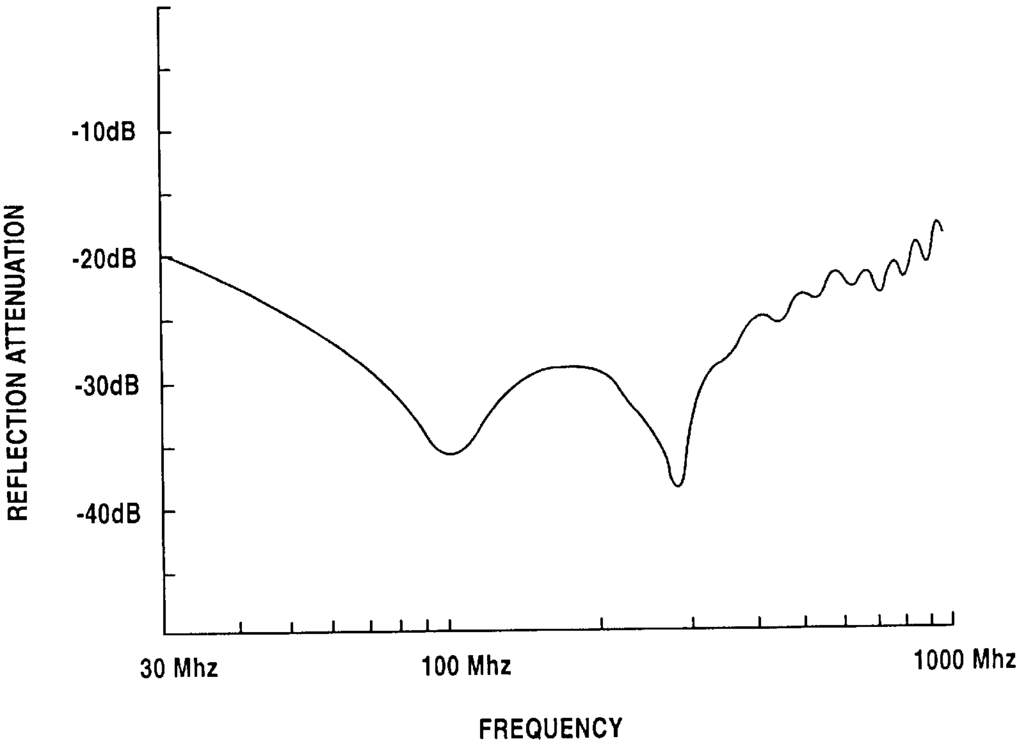
FIG. 4 is a graph showing the wave-absorbing property of a wave absorber obtained by laminating a ferrite type wave absorber on the wave absorber obtained in Example 3.
Figure 5:
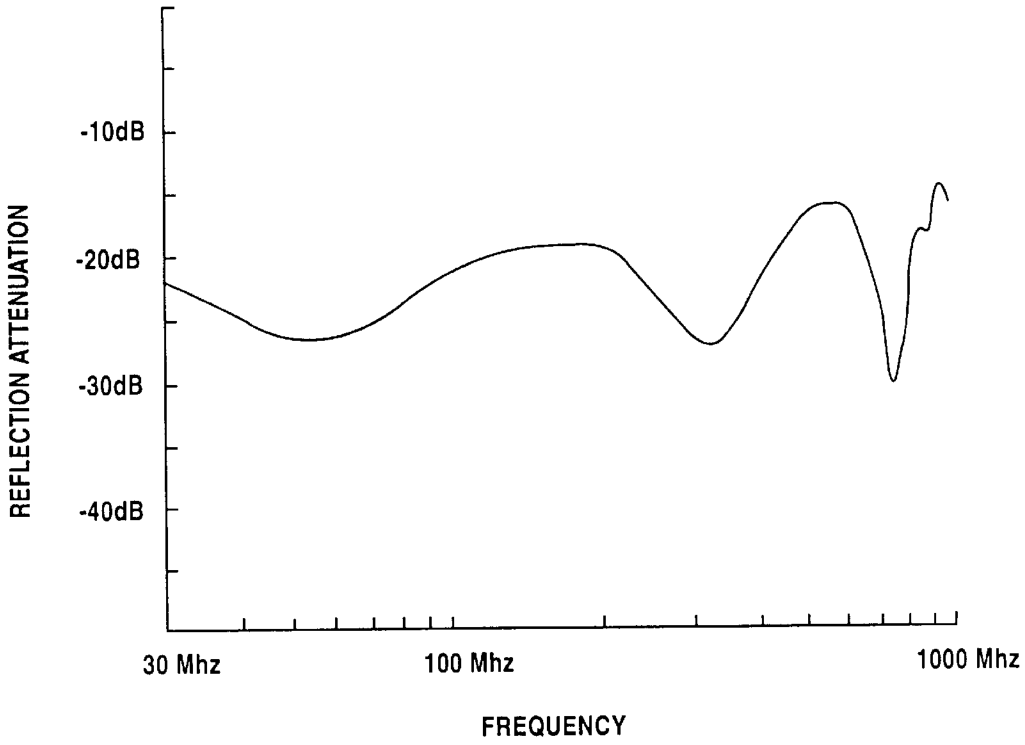
FIG. 5 is a graph showing the wave-absorbing property of a wave absorber obtained by laminating a ferrite type wave absorber on the wave absorber obtained in Example 4.
Figure 6:
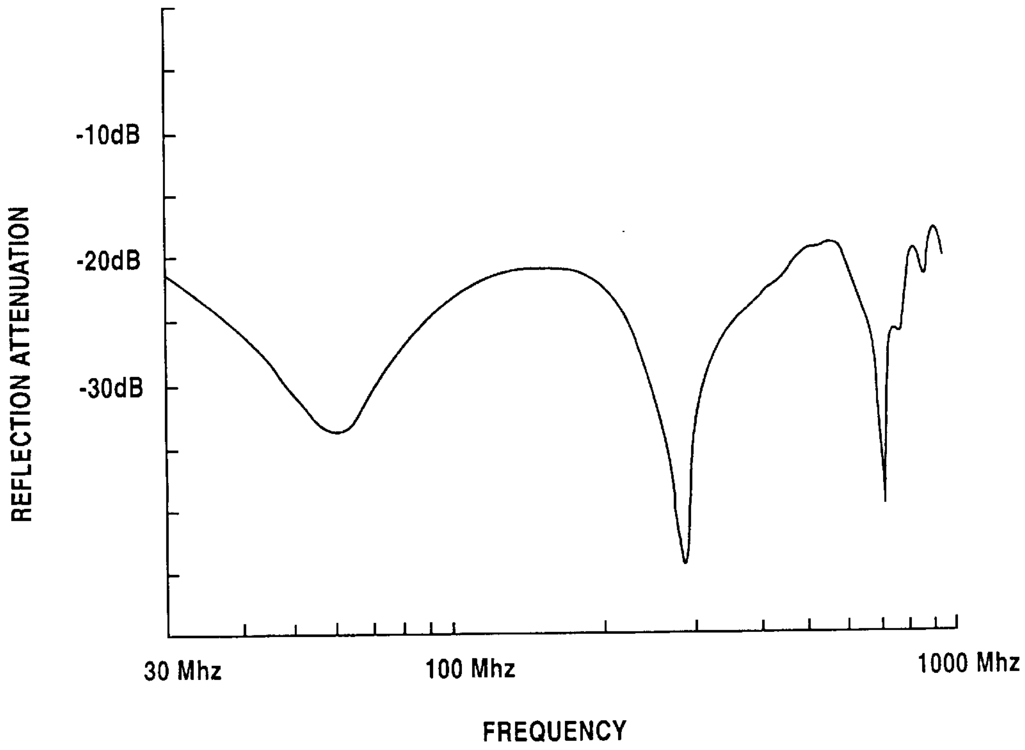
FIG. 6 is a graph showing the wave-absorbing property of a wave absorber obtained by laminating a ferrite type wave absorber on the wave absorber obtained in Example 5.
Figure 7:
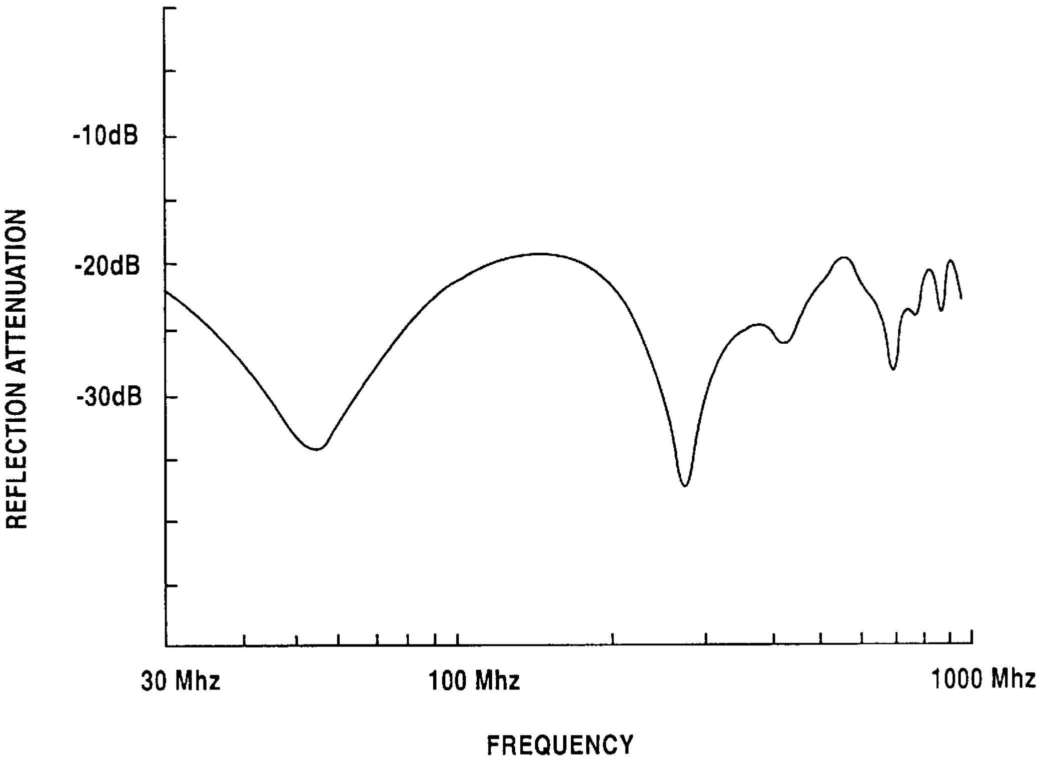
FIG. 7 is a graph showing the wave-absorbing property of a wave absorber obtained by laminating a ferrite type wave absorber on the wave absorber obtained in Example 6.
Figure 8:
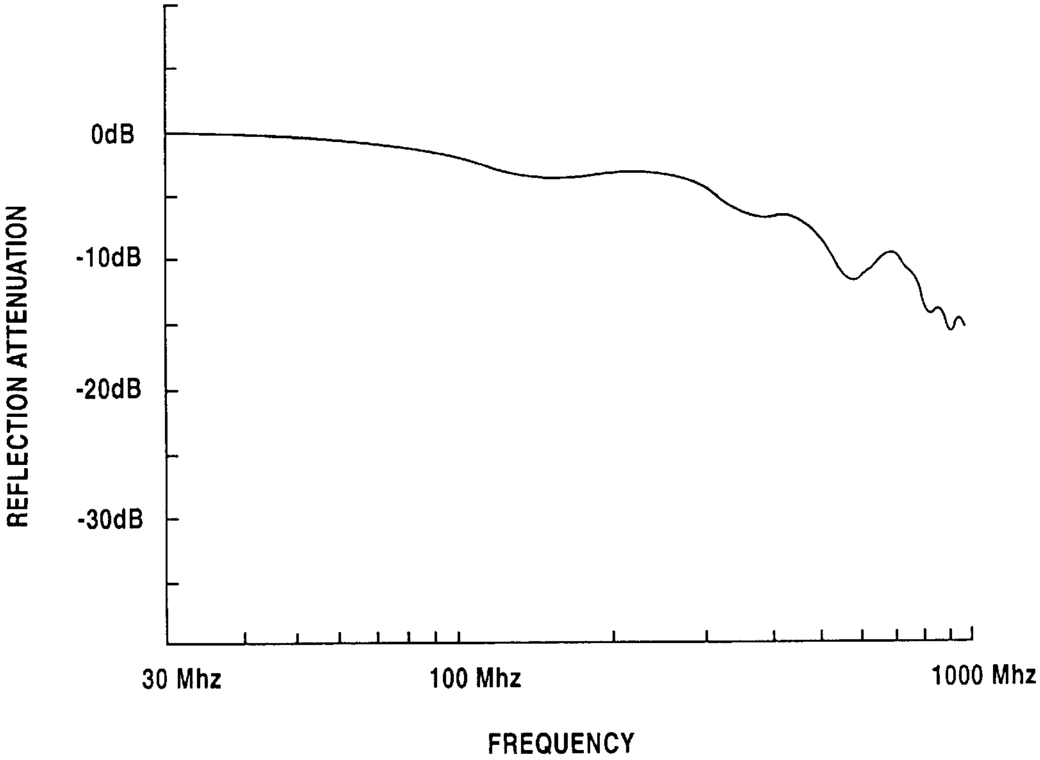
FIG. 8 is a graph showing the wave-absorbing property of the wave absorber obtained in Comparative Example 1.
Figure 9:
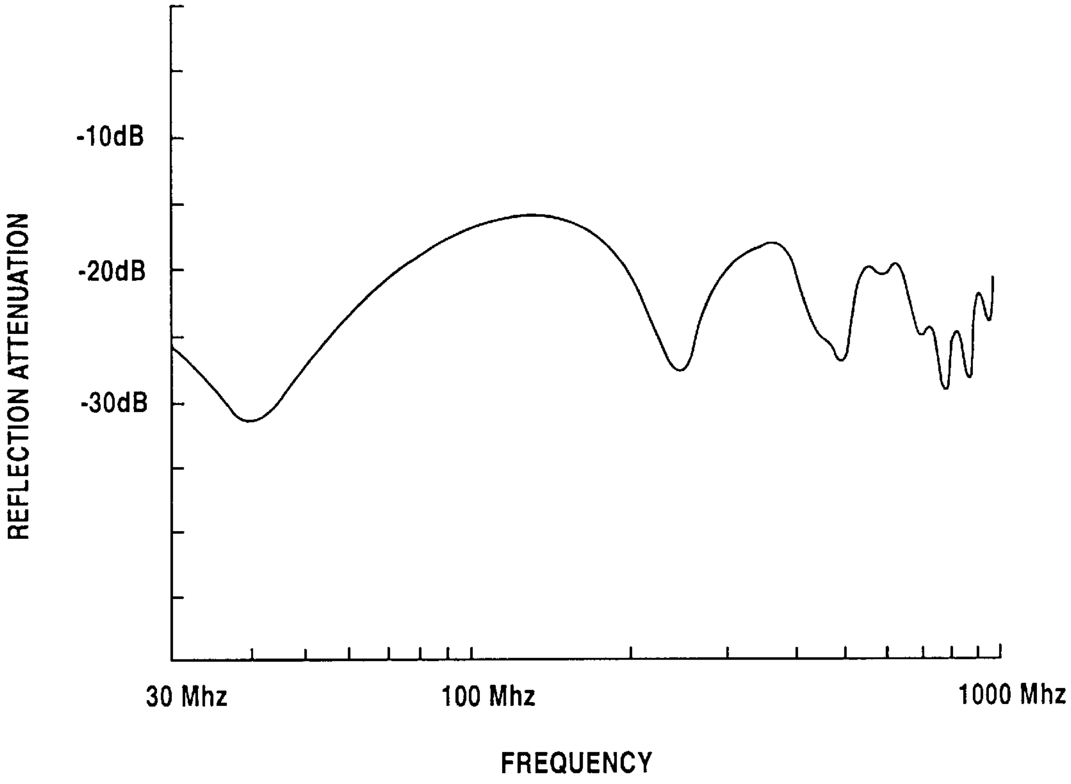
FIG. 9 is a graph showing the wave-absorbing property of a wave absorber obtained by laminating a ferrite type wave absorber on the wave absorber obtained in Comparative Example 2.

The present invention is hereinafter described in detail.

As mentioned previously, the wave absorber of the present invention is obtained by dispersing a dielectric loss material (e.g. carbon black) in a known foamed melamine resin obtained by foaming a resin composition comprising a melamine-formaldehyde condensate and a foaming agent as the main components. Therefore, the foamed melamine resin used in the present invention may comprise various components used in conventional melamine-formaldehyde resins or foamed materials thereof.

The melamine-formaldehyde condensate can be obtained, for example, by mixing melamine, formalin (35% aqueous solution) and paraformaldehyde and reacting them in the presence of an alkali catalyst with heating. The proportion of melamine and formaldehyde used can be, for example, 1 (melamine):3 (formaldehyde) in terms of molar ratio.

The thus-obtained melamine-formaldehyde condensate has a viscosity of preferably 1,000–100,000 Cp, more preferably 5,000–15,000 Cp and a pH of preferably 8–9.

The foaming agent used is, for example, a straight-chain alkane with pentane or hexane being preferred.

In the present invention, the resin composition comprising a melamine-formaldehyde condensate and a foaming agent as the main components may comprise an emulsifier in order to obtain a uniform foamed material. The emulsifier includes, for example, metal alkyl sulfonates and metal alkylaryl sulfonates with sodium dodecylbenzene sulfonate being preferred.

The resin composition may further comprise a curing agent for curing of foamed resin composition. The curing agent includes, for example, an acidic curing agent with formic acid, hydrochloric acid or oxalic acid being preferred.

The foamed resin used in the present invention can be obtained by adding as necessary, to the above-mentioned resin composition comprising a melamine-formaldehyde condensate and a foaming agent as the main components, the above-mentioned emulsifier and curing agent and various fillers such as fibrous or powdery structure-reinforcing material, pigment, dye and the like, and then heating the resulting mixture at a temperature not lower than the boiling point of the foaming agent to give rise to foaming.

Such a process for production of a foamed resin is described in, for example, Japanese Patent Application Laid-Open [Kokai] No. 55-142628 and Japanese Patent Application Laid-Open [Kokai] No. 56-152848. In the present invention, a foamed material of isocyanate-modified melamine resin may be used, and a process for production of such a foamed resin is described in Japanese Patent Application Laid-Open [Kokai] No. 7-157590.

The thus-obtained foamed resin has cells which are preferred to be substantially open, because the foamed resin must disperse a dielectric loss material (e.g. carbon black) inside uniformly or almost uniformly as described later.

The shape of the foamed resin may be a shape possessed by the foamed resin as produced, but may have a plate shape, a block shape, or a conical shape or a multi-conical shape. Incidentally, "conical shape or multi-conical shape" refers to a circular cone, a triangular pyramid, a square pyramid, a wedge-like cone, a combination of one of these cones or pyramids with a pedestal, or a plurality of such cones or pyramids connected with each other.

The dielectric loss material used in the present wave absorber is preferably a material showing sufficient dielectric loss to a high-frequency electromagnetic wave entering the wave absorber. Particularly preferred is a material which is electroconductive and has relatively large particle diameters and specific surface area. Such a dielectric loss material includes, for example, carbon black and graphite. The particle diameters thereof can be, for example, 15–100 $\mu$m, and the specific surface area thereof can be, for example, 100–1,500 $m^2/g$.

The dielectric loss material is dispersed in the foamed melamine resin in an amount of preferably 0.5–30 $kg/m^3$. When the amount of the dielectric loss material dispersed is less than the lower limit, the resulting wave absorber does not have sufficient wave absorbability. When the amount is more than the upper limit, the wave absorber has a dielectric loss material layer on the skeleton and, therefore, reflects part of the electric wave entering the wave absorber, resulting in reduced wave absorbability.

The dielectric loss material can be dispersed in the foamed melamine resin in, for example, the following manner. The foamed melamine resin is impregnated with a treating solution comprising a dielectric loss material (e.g. carbon black), a binder and additives (e.g. dispersing agent and curing agent) to allow the treating solution to penetrate sufficiently deep into the inside of the foamed resin; then, the impregnated foamed melamine resin is taken out of the solution and the excessive solution remaining in the foamed resin is removed by natural falling or by squeezing using a roller, a press or the like; the resulting material is dried; and the dried material is as necessary shaped into a desired shape by the use of a horizontal cutter, a circular cutter, a two-dimensional processor, a saw, a cutter knife or the like, all used in ordinary shaping of foamed resin. Incidentally, the impregnation may be conducted by placing the foamed melamine resin in the treating solution for several hours, or may be conducted in a shorter time by repeating compression and release in the treating solution to forcibly remove the air inside the foamed resin.

In the impregnation, there can be used an impregnator generally used in impregnation of foamed polyurethane. In the present invention, the times of compression and release necessary for impregnation deep into the interior of foamed melamine can be fewer than those used in impregnation of foamed polyurethane.

When the foamed melamine resin is a hard type, the dielectric loss material can be dispersed therein at the time of production of the foamed melamine resin.

The thus-obtained wave absorber of the present invention can have, for example, a conventional structure shown in FIG. 1, comprising a pedestal 1 and a plurality of projections 2 of square cone shape provided on the surface of the pedestal 1 and can be applied in an anechoic chamber by itself; or can be piled up to a ferrite type wave absorber of plate shape, block shape or grille shape by, for example, adhering, fastening or assembling, and applied as a pile. The fastening can be made by use of a non-metallic fastener of an appropriate shape, and the assembling can be made by shaping an each contacting portion of the present wave absorber and a ferrite type wave absorber to a shape which engages with each other. When the present wave absorber is applied as a pile comprising the present wave absorber and a ferrite type wave absorber as above, the pile can show improved wave absorbability at a low-frequency side.

The present wave absorber may also be used for prevention of jamming in the vicinity of the outer wall of a building or antenna, or in the vicinity of a measurement jig or measurement apparatus.

The present invention is hereinafter described specifically by way of Examples and Comparative Examples.

EXAMPLES 1–5

A commercial foamed melamine resin block having open cells [Basotect (trade name), product of BASF, bulk density: 11 kg/$m^3$] was impregnated with a treating solution in which carbon black and a binder were dispersed; was squeezed uniformly by the use of a roller; and dried at 80° C. for 24 hours to obtain wave absorbers different in carbon black content, as shown in Table 1. Incidentally, the carbon black content was controlled by the concentration of the treating solution and the degree of squeezing of impregnated foamed resin.

EXAMPLE 6

Melamine and formaldehyde were mixed at a molar ratio of 1:3, followed by adjusting a solid portion to 80%. Thereto was added a catalyst (2N sodium hydroxide). The mixture was subjected to a reaction at 120° C. for 50 minutes to obtain a melamine-formaldehyde condensate having a final resin concentration of 76% and a final viscosity of 12,000 cP. To 100 parts by weight of this condensate were added 6.3 parts by weight of an aqueous solution containing 30% of sodium dodecylbenzenesulfonate, 11.4 parts by weight of pentane, 9.5 parts by weight of ammonium chloride, 2.7 parts by weight of formic acid and 7.6 parts by weight of CR 200 (polymeric-4,4-diphenylmethane diisocyanate, product of Mitsui Toatsu Chemicals, Inc.). The mixture was foamed in an oven of 100° C. to obtain a foamed melamine resin. This foam had a density of 27 kg/$m^3$.

This foam was impregnated with a treating solution in which carbon black and a binder were dispersed; was squeezed uniformly by the use of a roller; and dried at 80° C. for 24 hours to obtain a wave absorber having a carbon black content as shown in Table 1. Incidentally, the carbon black content was controlled by the concentration of the treating solution and the degree of squeezing of impregnated foamed resin.

Comparative Examples 1 and 2

A commercial foamed polyurethane resin of soft type was impregnated with a treating solution in which carbon black and a binder were dispersed; was squeezed uniformly by the use of a roller; and dried at 80° C. for 24 hours to obtain wave absorbers each having a carbon black content as shown in Table 1. Incidentally, the carbon black content was controlled by the concentration of the treating solution and the degree of squeezing of impregnated foamed resin.

The wave absorbers obtained in Examples and Comparative Examples were measured for bulk density, content of dielectric loss material (grams of dielectric loss material per liter of wave absorber), oxygen index and flammability. The results are shown in Table 1. Incidentally, oxygen index was measured in accordance with JIS K 7201 (Testing method for flammability of polymeric materials using the oxygen index), and flammability was determined by measuring a time from fire-catching to blowing-out of flame in accordance with JIS A 9511 (Preformed cellular plastics thermal insulation materials).

TABLE 1

| | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Bulk density (kg/$cm^3$) | 11.5 | 13.5 | 16.0 | 18.5 | 26.0 | 32.0 | 25.0 | 35.0 |
| Content of dielectric loss material (g/l) | 0.5 | 2.5 | 5.0 | 7.5 | 15.0 | 5.0 | 5.0 | 15.0 |
| Oxygen index | 33.0 | 32.5 | 31.0 | 26.0 | 25.0 | 29.0 | 19.0 | 18.0 |
| Flammability (sec) | 0 | 0 | 0 | 0 | 0 | 0 | 25 | 30 |

In the flammability test, none of the samples of Examples caught fire.

As is clear from the results of Table 1, the wave absorber of the present invention is very lightweight and has self-extinguishing property.

The wave absorber obtained in each Example or each Comparative Example was examined for wave-absorbing property. The wave-absorbing property was examined by preparing a cylindrical sample, filling the sample in a co-axial guidewave, and measuring the reflection attenuation of the sample at a 30–1,000 MHz zone by the use of a net work analyzer. The graphs of frequency characteristics obtained are shown in FIGS. 2 to 9. As is clear from the results of these figures, the present wave absorber shows high wave-absorbing property, owing to a uniformly dispersed dielectric loss material.

In the present invention, a self-extinguishing and very lightweight wave absorber can be obtained by the use of a foamed melamine resin. The wave absorber can be used in various tests without causing fire-catching, fuming, combustion, generation of harmful gas, etc. even when heat generation and temperature rise have arisen owing to the absorption of high-energy electric wave.

Further, the foamed melamine resin used in the present invention, which has very uniform and fine cells, can be easily and uniformly impregnated with a dielectric loss material deep into the interior by the use of an impregnator conventionally used for polyurethane foam. Therefore, the wave absorber having high wave-absorbing property can be produced easily.

What is claimed is:

1. A wave absorber comprising a foamed resin and a dielectric loss material dispersed in the foamed resin in an amount of 0.5–30 kg/$m^3$, wherein the foamed resin is a foamed melamine resin obtained by foaming a resin composition comprising, as the main components, a melamine-formaldehyde condensate and a foaming agent, said wave absorber having a conical shape or a multi-conical shape.

2. A wave absorber according to claim 1, wherein the foamed resin has open cells.

3. A wave absorber which is a laminate of a ferrite wave absorber and a wave absorber of claim 1.

* * * * *